Aug. 1, 1950        G. L. ERICKSON        2,516,860

TELEGRAPH SIGNAL DISTORTION INDICATING DEVICE

Filed May 16, 1944        5 Sheets-Sheet 1

INVENTOR
G. L. ERICKSON

BY

ATTORNEY

Aug. 1, 1950           G. L. ERICKSON           2,516,860

TELEGRAPH SIGNAL DISTORTION INDICATING DEVICE

Filed May 16, 1944           5 Sheets-Sheet 2

INVENTOR
G. L. ERICKSON

BY

ATTORNEY

Aug. 1, 1950  G. L. ERICKSON  2,516,860
TELEGRAPH SIGNAL DISTORTION INDICATING DEVICE
Filed May 16, 1944  5 Sheets-Sheet 3
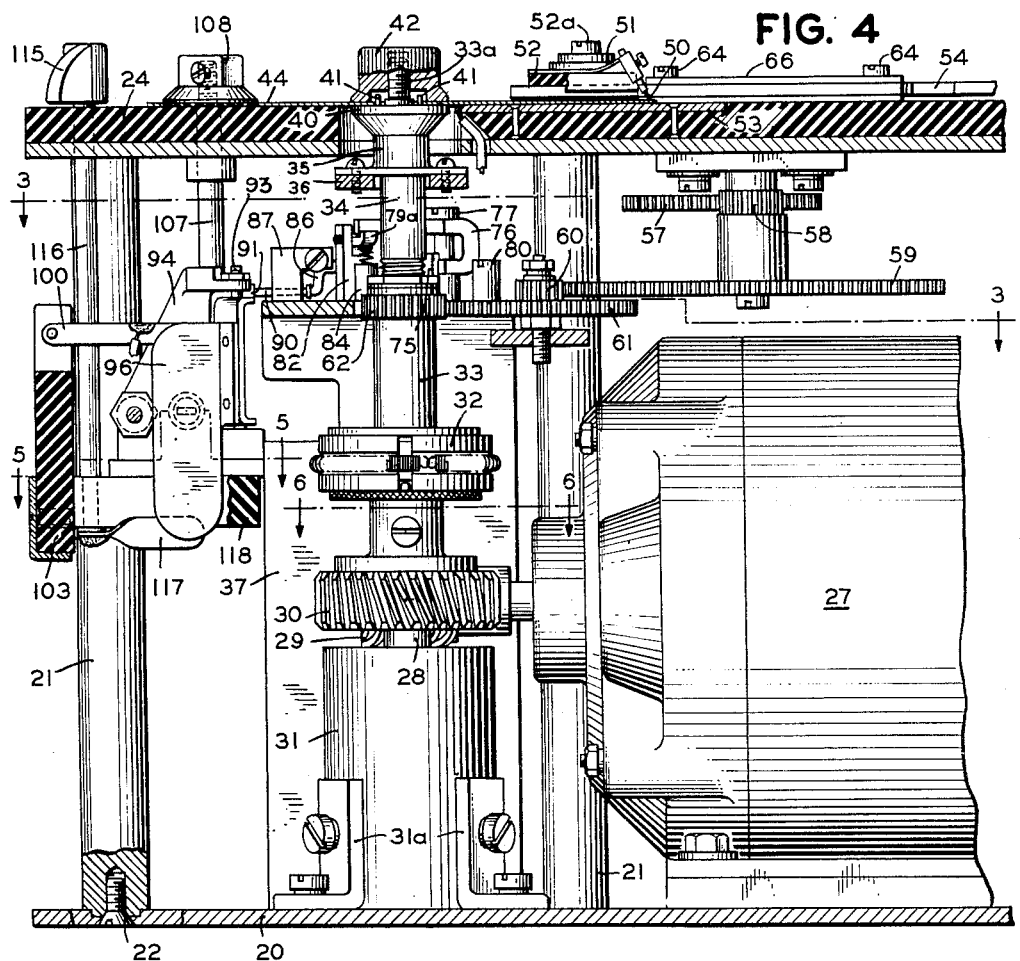
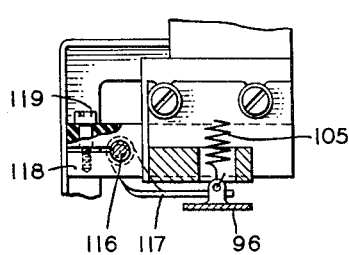
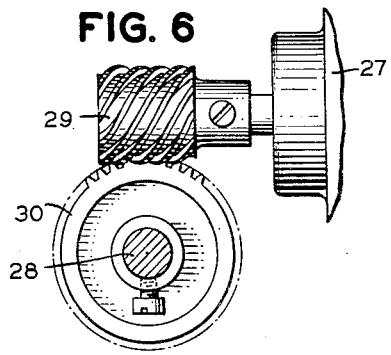
INVENTOR
G. L. ERICKSON
BY
ATTORNEY Aug. 1, 1950  G. L. ERICKSON  2,516,860
TELEGRAPH SIGNAL DISTORTION INDICATING DEVICE
Filed May 16, 1944  5 Sheets-Sheet 4

INVENTOR
G. L. ERICKSON
BY
ATTORNEY

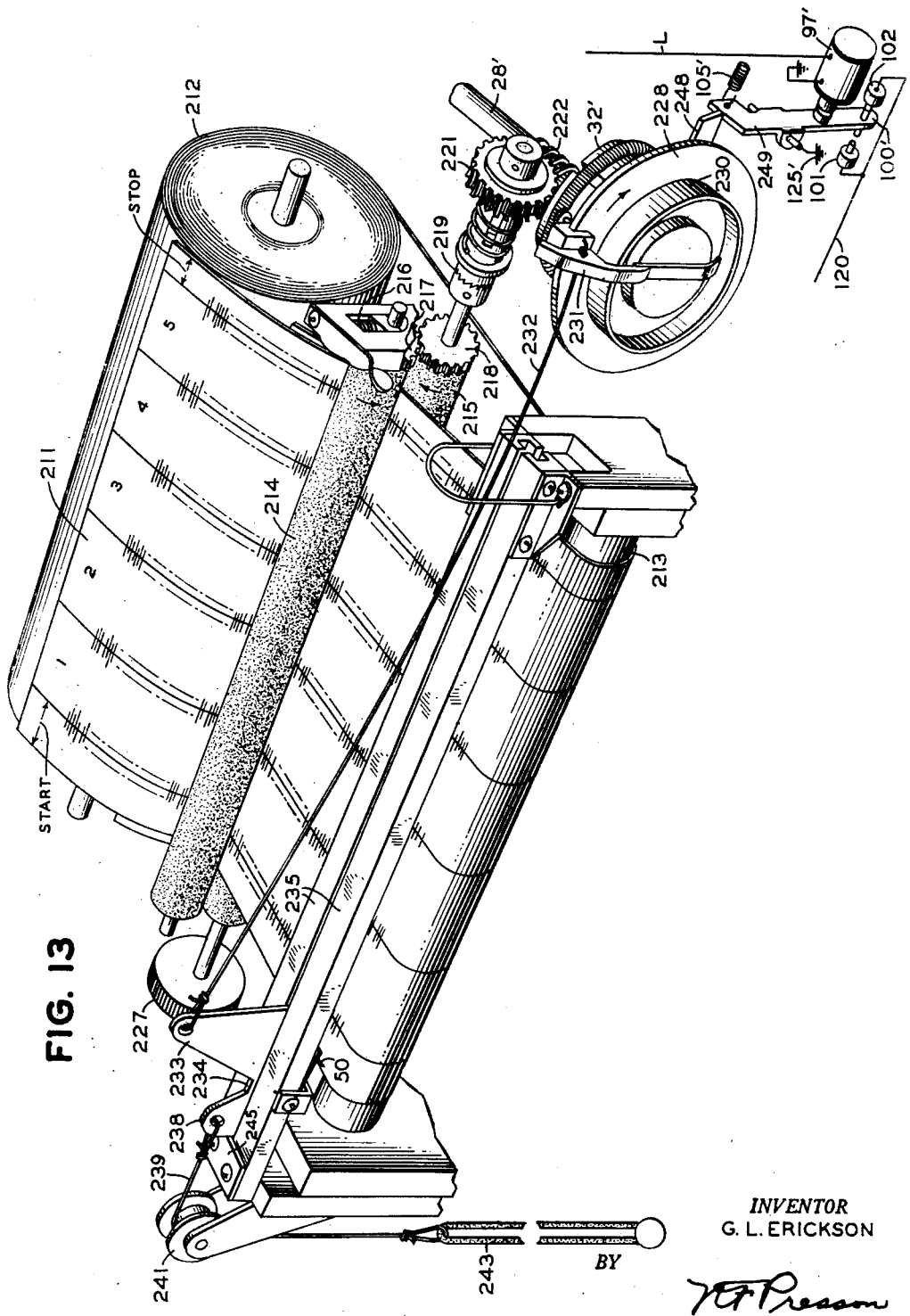

Patented Aug. 1, 1950

2,516,860

UNITED STATES PATENT OFFICE 2,516,860

TELEGRAPH SIGNAL DISTORTION INDICATING DEVICE

George L. Erickson, Hasbrouck Heights, N. J., assignor to The Western Union Telegraph Company, New York, N. Y., a corporation of New York Application May 16, 1944, Serial No. 535,813

7 Claims. (Cl. 346—33)

1

This invention relates generally to improved telegraph signal testing and recording apparatus, and more particularly to a device for determining and recording the quality of permutation code telegraph signals as received by recording apparatus, for example, a start-stop printer, and for making a record which is representative of what the printer or other telegraph apparatus would receive at the situs of its installation, although the signals may also be observed and recorded at their point of origin, such as at a commutator, distributor or keyboard, or at any point along the line or circuit.

Means have heretofore been employed for determining the quality of teleprinter signals which comprise a measure of "range," that is, the distance through which the receiving commutator may be oriented with respect to the signals before printing failures occur. Such a method of measuring signal quality provides an over-all figure of maximum signal loss but does not give an adequate idea as to the nature or extent of the variations of individual signals. In accordance with the present invention there is provided a device for recording individual teleprinter signals as interpreted by the printer operating magnet or magnets, and the device is useful not only in determining the general quality of received signals but also in revealing the characteristics peculiar to various types of signal impairments. For example, signals as received directly from the transmitting teleprinter may be influenced by mechanical imperfections in design or in manufacture, such as contact chatter, cam alignment, contact overlap and speed variations. The signals are further subject to circuit losses such as bias, inductive interference, duplex unbalance and characteristic distortion.

An object of the invention is to provide an improved testing device for determining and producing a record of the quality of received permutation telegraph signals, and in which various characteristic signal impairments or distortion effects are accurately detected and recorded in a manner to permit of a more detailed analysis of individual signal pulses.

A further object is a testing device of the character disclosed which may be adapted for testing and producing a record of start-stop teleprinter signals as interpreted by the particular electromagnetic arrangement which obtains in the printer when in its operating condition or position.

An additional object is a testing device in which a record of the quality of the individual received signals may readily be provided by means of a recording chart and stylus structure in which the chart is marked in accordance with the signals whose quality is to be observed.

Other objects and advantages will be apparent from the following detailed description of the illustrative forms of the invention, taken in connection with the accompanying drawings, in which:

Fig. 4 is a vertical sectional view taken along the line 4—4 of Fig. 3;

Fig. 5 is a fragmentary sectional view taken along the line 5—5 of Fig. 4, showing certain details of tension adjusting means for the armature of the printer electromagnet;

Fig. 6 is a fragmentary view taken along the line 6—6 of Fig. 4, showing details of certain driving gears employed;

Figure 7:
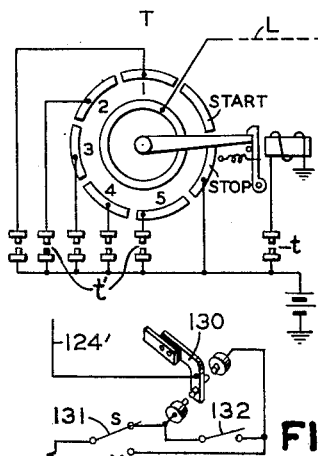
Figure 8:
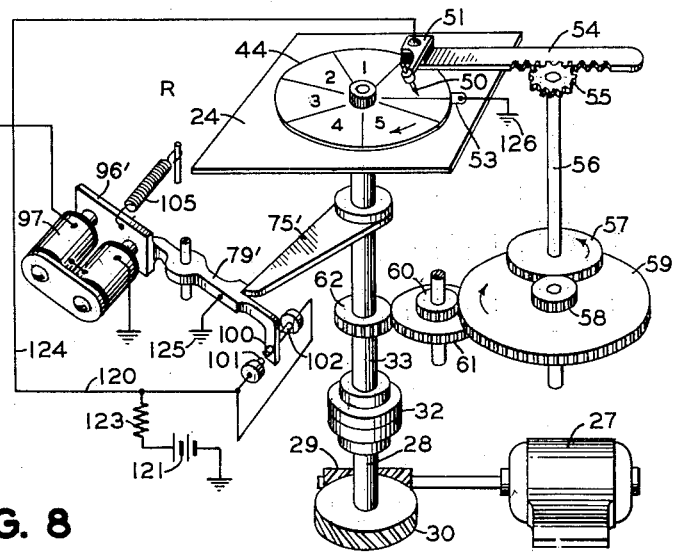
Figure 9:
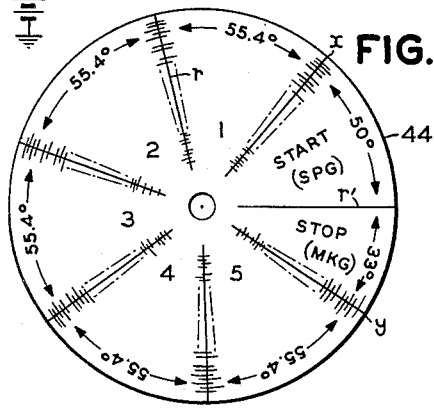
Figure 10:
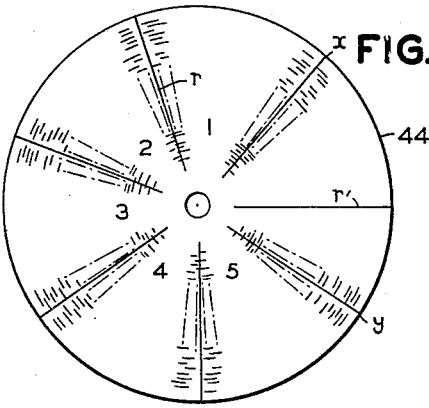
Figure 11:
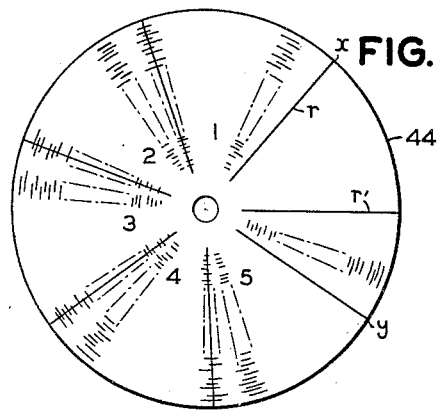
Figure 12:
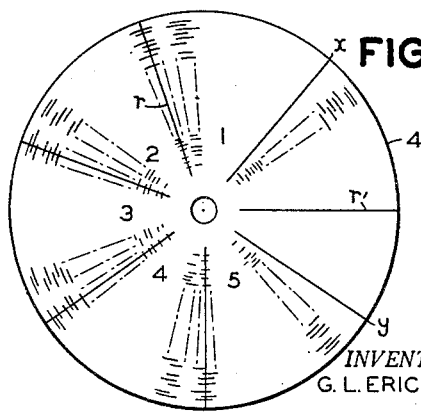

Fig. 7 diagrammatically shows a start-stop printer circuit and the signal testing and recording circuit with certain apparatus associated therewith;

Fig. 8 shows a modified form of recording circuit;

Fig. 9 shows a chart on which have been recorded substantially perfect start-stop printer signals received by the device;

Figs. 10, 11 and 12 are charts showing different kinds of distortion in the received printer signals; and Fig. 13 shows a modified form of recording mechanism in which a continuous strip record of the signals may be obtained.

Referring to the drawings, and particularly to Figs. 1 to 4, 6 and 7 thereof, the device illustrated is shown as comprising a metallic mounting base or plate member 20 having several vertical posts 21 secured at their lower ends to the base in any suitable manner, as by machine screws 22 seen in Fig. 4. At their upper ends the posts 21 support a metal plate 23, the latter plate supporting a top plate 24 of suitable insulating material, such as a phenolic condensation product. Plate 24 is secured to plate 23 in suitable manner, as by machine screws 25, Fig. 1, and the plate assembly is secured to the posts 21 by machine screws 26 which thread into the ends of the posts.

Mounted on the base 20 is a motor 27 which preferably is of the alternating current type, although a direct current motor may also be employed. The motor drives a vertical shaft 28, Figs. 4 and 6, through the medium of a reducing worm and gear 29, 30, the lower end of shaft 28 being rotatably mounted in a bearing anchored within the housing 31 which is secured to the base 20 in any suitable manner, as by the lugs 31a. Shaft 28 drives a shaft 33 through the medium of a slip friction clutch assembly 32, which type of friction drive is well known in the art. The shaft 33 at its upper end has a reduced portion 33a that passes through and is supported by a tubular bearing 34 rigidly secured by a flange 35 to a U-shaped bracket member 36, the shaft passing through an opening in the bracket member. Bracket 36 is secured to another U-shaped bracket 37 which is rigidly secured to the base plate 20.

The upper end of shaft 33 has a chart supporting surface, such as a collar 40, secured thereto and rotatable therewith, the collar having tapered sides and a flat circular upper surface with small pins 41 projecting therefrom. On the upper threaded end of the reduced portion 33a of the shaft 33 is a knurled thumb nut 42 which may be screwed down so as to clamp a circular paper recording chart or disc 44 between the thumb nut 42 and collar member 40. The chart has a hole in the center thereof so that it passes over the threaded end 33a, and the pins 41 in the collar 40 puncture or penetrate the chart and so cause it to rotate with the shaft 33 whenever the latter is rotated in a manner hereinafter described. The securing nut 42 has an inner recessed portion, as seen in Fig. 4, thereby to provide clearance for the pins 41 on the collar 40.

Figure 1:
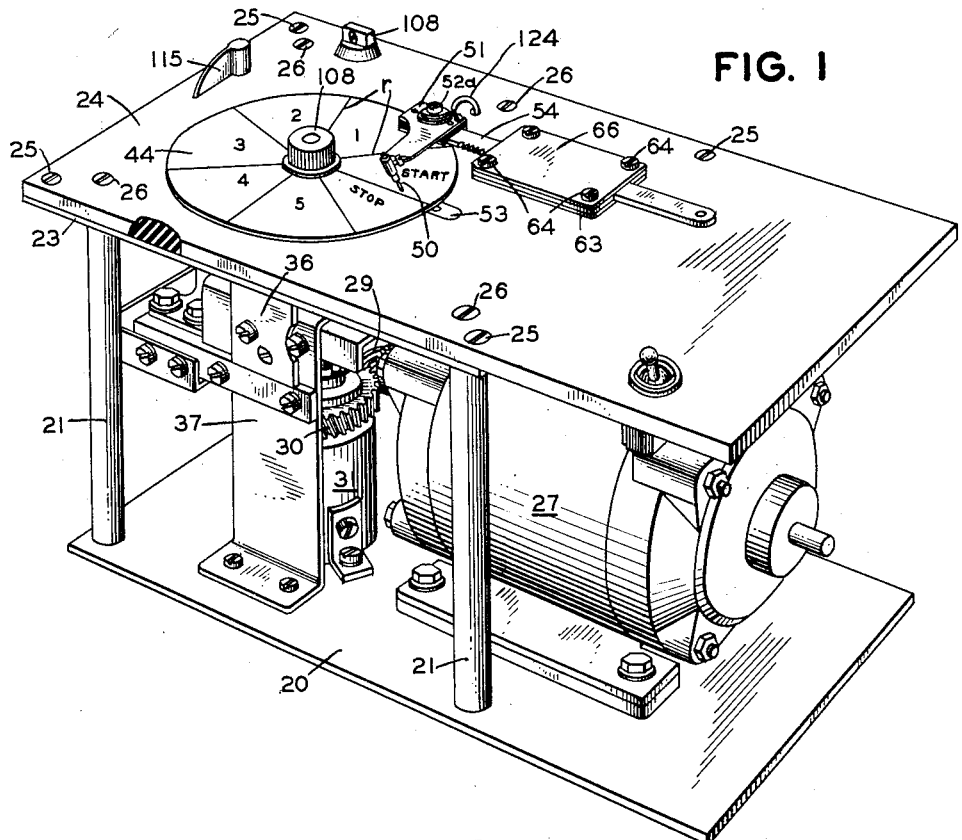
Fig. 1 is a perspective view of a portable testing and recording device embodying the principles of the instant invention.

The chart may be marked by the signals in any suitable manner by a recording pen or stylus which impinges upon or otherwise marks the chart; preferably, although not necessarily, the signals are recorded on the chart 44 by means of an electrical stylus 50 which applies a source of marking current or potential to the recording paper in accordance with the received teleprinter signals, as interpreted by the electromagnetic arrangement controlling the current to the marking stylus or equivalent. Such a chart may comprise any suitable type of electrical recording sheet or stencil, but preferably comprises an electrosensitive recording blank as disclosed in Patents Nos. 2,283,558 and 2,294,146. The stylus 50 is supported in suitable manner, as by a flat spring 51, which is mounted on an insulating block 52, the spring serving to apply the proper contact pressure to the recording sheet and to connect the stylus in circuit with the source of marking current, as hereinafter set forth in the description of the electrical marking circuit employed. A grounded metal countersunk strip 53, Figs. 1 and 4, is embedded in the upper surface of the insulating plate 24 so as to be flush therewith, and is disposed beneath the stylus, thereby to complete an electrical circuit from the stylus to ground through the recording paper 44.

Figure 2:
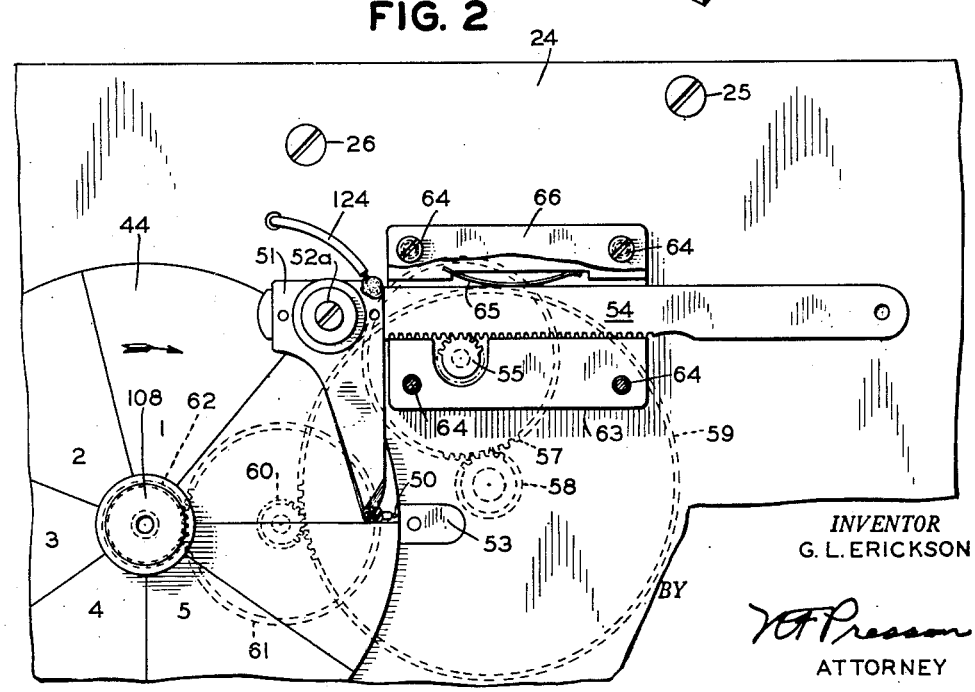
Fig. 2 is a fragmentary top plan view of the device with certain parts broken away, showing details of the recording stylus actuating structure.

The insulating block 52 with the attached stylus is secured, as by a machine screw 52a, to suitable mechanism for advancing the stylus progressively in a radial direction with respect to the chart as recording of successive groups of signal impulses proceeds. In the embodiment illustrated this mechanism comprises a rack 54 having teeth engaged by a pinion 55, seen more clearly in Figs. 1, 2 and 7, the rack and pinion being driven through a shaft 56 and a train of gears 57, 58, 59, 60, 61 and 62 from the shaft 33. As the disc of recording paper 44 rotates, the stylus is thereby caused to move inwardly in a radial direction from the outer periphery of the disc at a suitable rate, for example, at a rate to complete its excursion in approximately one-half minute whereby a record may be obtained of each printer signal received during such period. Through choice of gearing and disc diameter this period may be varied to suit any particular requirements. As shown in Fig. 2, the rack 54 is reciprocable within a guideway in a housing plate assembly 63 secured, as by screws 64, to the plates 23 and 24. A bowed leaf spring 65 is provided to keep the rack in driving engagement with pinion 55 and also in proper alignment within the guideway, the structure being protected by a cover plate 66.

In order to reproduce the operating characteristics of the actual telegraph receiving mechanism to which the signals are applied in practice, the mechanism of the recorder preferably, although not necessarily, is of the same or a corresponding type. Therefore, in the illustrative embodiment disclosed herein, certain of the mechanism corresponds to that employed in a receiving telegraph printer of a type well known in the art, for example, a start-stop typebar printer which can be mechanically operated under control of a selector magnet, such a printer being illustrated in Patents Nos. 1,745,633 and 1,783,382, the disclosures of which are incorporated herein by reference. The start and stop mechanism of such a printer comprising the clutch, stop arm and latch mechanism and the selector magnet for operating the trip, are included in the testing and recording mechanism disclosed herein, although other elements of the printer, such as the transmitting commutator or contact assembly, the selector cams and the remainder of the printing mechanism are not required.

Figure 3:
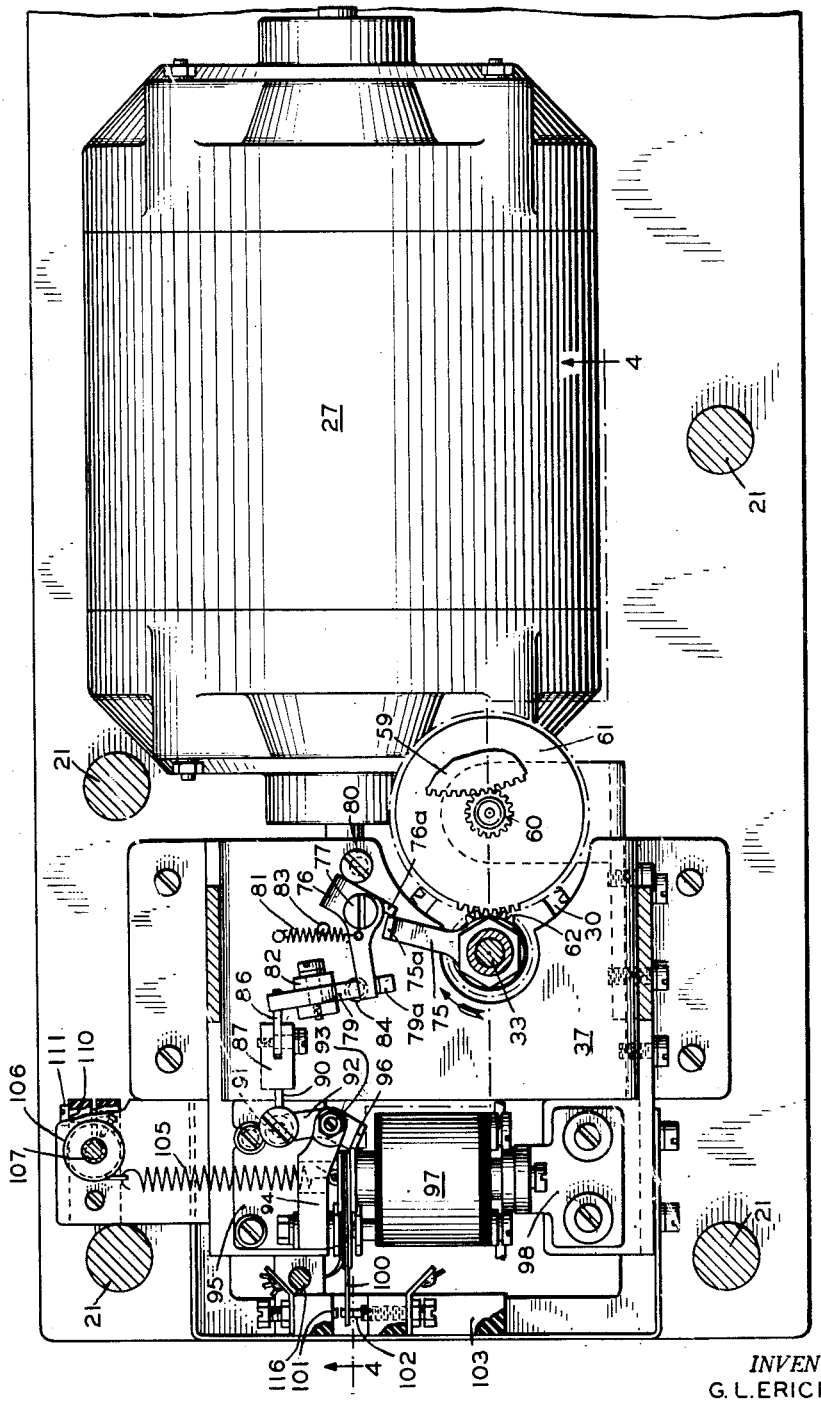
Fig. 3 is a top plan view of the device with the upper cover plate and appurtenant parts removed, showing various details of the driving and control mechanism.

The start and stop mechanism, which is seen more clearly in Figs. 3 and 4 of the instant drawings, comprises a radial arm 75 that is carried by and rotates with the shaft 33. The arm has an upturned portion 75a, Fig. 3, which is arranged to engage a shoulder 76a on a U-shaped stop gate or dog 76. The stop gate is pivotally mounted at 77 on the bracket member 37, and a light spring 81 tends to move the stop gate toward an adjustable eccentric stop 80 on the bracket 37. The shaft 33 and friction clutch 32 tend to rotate the radial arm 75 in a clockwise direction, as viewed in Fig. 3, and the engagement of the upturned portion 75a of the radial arm with the shoulder 76a tends to rotate the stop gate on its pivot and normally holds its free end against the shoulder 79a of a latch 79. This latch is pivotally mounted on a small bracket 82 which is secured to the large bracket 37, and its outer end is pressed into engagement with the free end of the stop gate 76 by light coil spring 84. A small bell crank member 86, which is pivotally mounted on a bracket 87, has an arm which extends under the inner end of the latch 79. Bracket 87 also receives and provides a guide for an operating pin 90, one end of which bears against the lower end of the bell crank 86, and the other end of which abuts against an eccentric adjusting stud 91. This stud is carried by a lever arm 92 which is pivotally mounted at 93 to an upstanding arm 94 of a bracket member 95, the latter bracket being rigidly secured to the supporting framework.

Connected to the lever 92 is the armature 96 of a printer magnet 97 which is secured by a bracket 98 to the supporting framework. The armature 96 carries a contact tongue 100 which is adapted to operate between signal marking and spacing contacts 101 and 102, these contacts being adjustably supported in an upstanding bracket 103 of suitable insulating material, such as fibre or the like, the insulating bracket 103 being secured in any suitable manner, as by screws, to the supporting framework. The armature 96 is biased to its spacing position by means of a spring 105, one end of which is secured to the armature in the manner shown in detail in Fig. 5, the other end of the spring being connected to a circular adjusting member 106 which is mounted on a shaft 107, the shaft passing through the upper plate 24 and carrying an adjusting knob 108, as seen in Fig. 4, whereby the biasing tension on the armature may be varied by turning the knob 108 in either direction, depending upon whether more or less tension is desired. The lower end of the adjusting rod 107 is received within a split portion of a fibre block 110 which applies clamping pressure, as by means of a machine screw 111, to hold the shaft 107 in any adjusted position.

In a start-stop system, each signal usually comprises in addition to the five selecting intervals or units, a starting interval of spacing conditions, and a terminable stop interval of marking condition during which the line is maintained in normal condition and preferably closed with current applied thereto. Thus, magnet 97 (which in the form shown comprises two coils connected in series) is normally energized and the parts of the start-stop mechanism are normally maintained in the position shown in Fig. 3, with the radial arm 75 held against movement by the stop gate 76.

During the starting interval of each signal, a spacing signal is received to deenergize the magnet 97, thus permitting the spring 105 to attract the armature 96, thereby moving lever arm 92 to the right, as viewed in Fig. 3, and this slides pin 90 to the right, causing the upper arm of bell crank 86 to bear against the under side of the adjacent or inner arm of the pivoted latch 79, thereby to depress and trip the latch portion 79a. Then the arresting stop gate or dog 76 is free to yield and permit the rotation of the arm 75. A stop 83 limits the extent of pivoted movement of the stop gate at this time. It will be noted that the arm 75 engages the shoulder 76a at a point closely adjacent to the pivot 77 of the stop gate, and that latch or shoulder 79 engages the free end of the stop gate at a considerable distance from its pivot so that the stop gate, engaged by the arm, presses lightly on the shoulder of the latch. Hence the tension of the armature spring 105 which serves to trip the latch can be very light and the amount of line current required to operate the magnet 97 correspondingly low. It will also be noted that, as soon as the arm 75 clears the shoulder 76a, the spring 81 moves the stop gate into engagement with the stop 80, with its free end spaced slightly from the shoulder 79a of the latch, so that there is no pressure exerted upon the latch, and although the latch and trip levers are vibrated by the armature lever during the selecting intervals of each signal, the load on the armature lever is very slight. During the marking or stop interval at the end of each signal, the magnet 97 is energized and the spring 84 holds the latch 79 in operative position so that the stop gate 76 co-operates with the arm 75 to arrest further rotation of this element which, in the actual printer, would arrest the distributing cam at the end of each selecting operation.

A manually controlled recording start lever 115, Fig. 4, is provided to hold the armature 96 in a marking or stop position prior to the initiation of a recording operation, the lever being secured to a rotatable shaft 116 which at its upper end passes through the plate assembly 23, 24 and at its lower end is received within a split portion of a fibre block 118 which applies clamping pressure, as by means of a screw 119, Fig. 5, to hold the shaft 116 in either the start or running position. The lower end of shaft 116 has a metal vane 117 welded or otherwise secured thereto, which vane is adapted to engage the lower portion of the armature 96 and hold its tongue 100 against contact 102 when the lever 115 is moved to the left, as viewed in Fig. 4. When the lever is thrown to the right, the vane 117 clears the armature 96, and the armature is free to move under the action of the received signals. In some cases it may take a few revolutions for the start pulse to fall in step when the release lever 115 is moved to the right and the armature begins to follow traffic signals.

As above stated, the armature of the selector magnet which controls the latching mechanism carries a contact tongue arranged to engage marking and spacing contacts. Referring to the circuit diagram comprising Fig. 7, in which various of the parts of the transmitter T and recorder R are shown diagrammatically and in simplified form, the contacts 101 and 102 of the recorder each are connected by means of a conductor 120 to a source of recording current such as the grounded battery 121, through a current limiting impedance 123. In the circuit illustrated, the recording circuit 124 to the stylus is shunted out by the tongue 100, which is grounded at 125, when the tongue is against either of the contacts 101 and 102. The stylus 50, however, is energized during transit of the tongue 100 between the contacts 101 and 102 over a circuit which may be traced from the grounded battery 121, impedance 123, conductor 124, stylus supporting spring 51, stylus 50, through the recording paper 44 and metal strip 53 to ground at 126. It will be appreciated that instead of a battery, as shown, the recording current may be supplied from any suitable source, such as obtained from an alternating current rectifier, or unrectified alternating current may be employed for recording purposes. In the arrangement shown a black or other colored mark is made on the recording disc upon each signal reversal received over the incoming line L, from marking to spacing and vice versa, which current is applied to the selector magnet 97 and thence to ground, that is, the chart is marked upon each operation of the selector magnet. If desired, the recording circuit may be modified, for example, as shown in Fig. 8 in which the conductor 124' is connected to an insulated portion 130 of the member 79' shown in Fig. 7, and by means of switches 131 and 132, the stylus may be made to mark during the period of each signal, leaving blank spaces on the chart for the transit time. For instance, if switch 131 is connected to the s contact, with switch 132 open, then the spacing signals only are recorded on the chart; if switch 131 is connected to the m contact, marking signals only are recorded, so that the length and position of each marking or spacing signal can be recorded independently. By closing switch 132, both marking and spacing signals are recorded, and the transit time of the armature appears as a blank space on the chart.

When at rest, the transmitting brush or contact of the transmitting teleprinter, generally designated by reference character T at the left of Fig. 7, rests upon its stop segment to send a marking pulse to line L, at which time current is applied to the line. This marking pulse energizes the selector magnet 97 so that the stop arm, such as the arm 79', remains engaged and prevents the radial arm 75' from rotating. When the keyboard of the transmitter T is operated to initiate transmission, contact t in the transmitting teleprinter is closed to release the distributor and send first a start or spacing pulse which de-energizes the selector magnet 97 and releases the stop arm 79' so that the arm 75' and shaft 33 will start to rotate. The start pulse is followed by the five marking and spacing intelligence pulses of the start-stop code, as determined by the closed or open positions of contacts t', which pulses cause operation of the selector magnet armature 96' to one position or the other relative to contacts 101 and 102 and cause the recording circuit to produce a mark on the recording chart upon the occurrence of each signal reversal.

When the recorder is intended for testing and recording signals for operating a printer of the character disclosed in the aforesaid patents, which is adapted to operate at a speed of approximately 390 characters per minute, the paper chart 44 is caused to rotate at a free speed of approximately 420 R. P. M. The five intelligence pulses are each subtended by an angle of 55.4° on the chart. Each such pulse requires a period of approximately 22 milliseconds of transit on the disc 44. A stop pulse, which in the embodiment illustrated is always marking, is subtended by an angle of approximately 33°, and a start pulse, which is always spacing subtends an angle of approximately 50°. The chart 44 may be divided into sectors by radial reference lines r spaced in accordance with the angular degrees of the various pulses, although if desired a transparent template with similar radial lines thereon may be placed over the chart to read the same instead of applying the reference lines directly to the chart 44. If radial lines are employed on the chart, the choice of the starting point for the disc, indicated by the radial line r' thereon, is determined by the mechanical characteristics of the device and preferably is so chosen that with substantially perfect signals the reversals will fall on the radial lines, as indicated in Fig. 9. Upon receiving each start pulse, a mark will be made on the chart by the recording circuit which will lie on, or correspond to, the dotted starting line, and these marks are very short in length because the chart has only started to rotate and does not reach its full rotational speed until the inertia of the rotating parts is overcome.

In the recording device herein described the paper disc is rotated in a start-stop manner in exactly the same manner as the receiving cam assembly of the printer, and the motion of the selector magnet armature with respect to the recording disc is indicated on the paper by a short black or other colored mark. In the arrangement of Fig. 7, this mark occurs during the period of movement of the selector magnet armature, whether it is from space to mark or mark to space. Thus, a permanent record is obtained of the armature motion as referred to the rotation of the receiving cam assembly of the printer. When the armature motion is uniform and spaced at intervals of 55.4° (22 milliseconds in this machine) for the intelligence pulses, as shown in Fig. 9, the action is considered to be perfect. The chart shown in Fig. 9 was obtained with RY test signal reversals. Traffic signal reversals will, of course, not be as frequent.

The chart shown in Fig. 10 is a record of typical traffic signals received over a long circuit, showing the effects of telegraph induction and duplex unbalance. It will be noted that no appreciable bias is indicated here, as the first and last reversals x and y respectively are no more displaced or scattered than are the intervening reversals. A displacement of the first and last reversals is the characteristic indication of bias since the reversals just following the spacing start pulse and those just preceding the marking stop pulse are always in one direction, as distinguished from the other reversals which will occur irregularly in each direction depending upon the letters being transmitted. The chart indicates that there is no appreciable bias loss and that the originating keyboard is sending good signals. Also, for example, if the irregularities were halved by changing from duplex to single transmission, this would indicate that half the loss is due to duplex unbalance.

One of the most prevalent faults that exists is that of bias in the printer selector armature operation, that is to say, the instant of motion from space to mark is not the same as if the reversal had been from mark to space. This condition may result from a bias in the signals as received from the line circuit or may be caused by a bias in the local circuit to the printer electromagnet. For example, the introduction of inductance or capacity in the local circuit to the printer will distort the current so as to produce a bias effect in the operation of the printer selector armature.

Fig. 11 is a recorded chart of traffic signals in which the markings indicate a large spacing bias, of approximately 25%. It will be noted that the reversal between the start pulse and the first intelligence pulse is delayed, which indicates that the spacing (start) pulse is lengthened and that the condition of spacing bias exists. All reversals from mark to space will fall in their correct positions because this is the reversal that determines the start so that, regardless of bias, these reversals will fall in their correct positions. The reversals from space to mark, however, are shifted (late), as is evident at the several intelligence pulse reversals. The amount of loss (in points) that this bias condition represents may be estimated by drawing two radial lines, the angle between these lines being measured by the range scale or a template to give the points lost in range.

Fig. 12 illustrates a chart on which the recorded traffic signals indicate a 25% marking bias condition, in which it will be noted that the space to mark reversals occur too early. It will be observed that the reversal between the start pulse and the first intelligence pulse is advanced, which shows that the spacing (start) is shortened and that a condition of marking bias exists. As on the previous record, only the reversals from space to mark are out of line, and the loss in range can be measured as described above.

Various other irregularities and types of distortions in the signals may be detected and recorded with the device herein disclosed, which irregularities may include such defects as contact spring variations, gears, governor action of the driving motor, etc. The general type of signal recorder described herein may be constructed in a variety of different forms depending upon whether the receiving mechanism is to correspond to that of start-stop printers, multiplex distributors or other types of telegraph receiving equipment, and in which means are provided for maintaining synchronism with the received signals.

If it is desired to produce a continuous strip record instead of a radial record, any of several known marking arrangements may be employed for this purpose, such for example, as the use of a spiral ridge on a light-weight rotatable scanning drum, the drum being carried by a shaft corresponding to shaft 33 which carries the radial paper disc 44 in the first described embodiment herein, and controlled in a similar manner. A strip of electrosensitive paper may be moved by feed rollers slowly past and in contact with the rotatable spiral ridge, the recording current pulses being applied to the electrosensitive paper strip by suitable means, such as a conducting straight edge substantially the length of the scanning cylinder, one of such marking arrangements being illustrated in the patent to Schnitzeler et al. 1,697,932. If preferred, the marking of the chart may be effected by a percussive or mechanical marking element, such as a movable bail or printing bar which intermittently is caused to strike or engage either the strip of recording paper or a carbon sheet or ink ribbon adjacent to the paper, the bail or bar being actuated in accordance with signals as received by the particular electromagnetic structure employed, one of such means of marking being illustrated in the patent to Young, Re. 20,152.

Fig. 13 shows another arrangement, generally in accordance with the patent to Wheeler et al. 2,311,803, in which a continuous sheet of sensitized recording paper 211 is supplied from a roll 212, the sheet being passed around a metallic roll or platen 213 which preferably is of good electrical conductivity, and is passed between two feed rollers 214 and 215. The feed rolls are arranged to grip the recording sheet or chart 211 between them with sufficient pressure to draw the paper from the roll 212 when the feed rolls are rotated in the directions indicated by the arrows. Part of this pressure is exerted by means of a spring 216 which is arranged to press down upon the shaft of the roll 214. It will be understood that the left hand end of the feed roll 214 is provided with a similar spring so that the pressure may be exerted uniformly over the entire width of the recording sheet. The feed rolls 214 and 215 are provided with gears 217 and 218, respectively, by means of which the roll 214 is driven by the rotation of the roll 215. The latter roll is connected by means of a clutch 219 to a pinion gear 221 which is driven by a worm 222 secured to the shaft 28' which may be driven in the manner of shaft 28 shown in Fig. 4. Normally, the feed roll 215 is driven solely by the rotation of the gear 221. However, the roll 215 is provided with a knob 227 so that it may be rotated manually at a more rapid rate in order to feed out blank paper between signal recordings if desired. The clutch 219 permits this type of manipulation of the paper feed mechanism to be effected independently of the motor driven paper feed mechanism.

A disc 228 is coupled by a friction clutch 32' to the shaft 28'. Secured to this disc is a drum 230 and also a deflecting member 231 which is provided with a sloping surface as illustrated in the drawings. A line 232 is attached to the deflecting member 231 and also to a lug 233 which forms part of the movable carriage 234. The line 232 may comprise a stout string, a cord, a light flexible wire, or the like, the only requirement being that it be light, flexible and substantially not extensible. The carriage 234 is arranged for sliding movement in a pair of guide rails 235 which have forms approximating channels and are arranged with the open sides thereof facing one another. A stylus 59' is secured to the underpart of the carriage so that it is in position to engage the surface of the recording sheet or chart 211. The carriage 234 is also provided with a lug 238 located adjacent to the left hand end thereof for attachment thereto of a retractile line 239. This line is passed around a guide pulley 241 and is attached to one end of a resilient extensible member 243 which may be an elastic band. The other end of the extensible member 243 is secured to any convenient fixed part of the apparatus.

The carriage 234 is arranged so that when it is subjected solely to the influence of the retractile line 239, it is held against a stop 245 at the left hand end of the recording apparatus. Also, while it is held in this position, as explained in detail in the patent, it is arranged to pivot in such manner that the stylus 59' is lifted from the recording sheet 211. When tension is applied to the line 232 in an amount sufficient to overcome the moment produced by the elastic band 243, the carriage 234 is pivoted in the opposite direction such that the stylus 59' is brought into contact with the surface of the recording sheet 211.

During a recording operation the shaft 28' rotates at a rate equal to one revolution per scanning line. However, when the apparatus is employed in a start-stop system, the shaft 28' continues to rotate as the scanning apparatus is periodically stopped for synchronizing purposes. Thus, in a complete recording operation the shaft will make a greater number of revolutions than there are scanning lines. The ratio of the gears 221 and 222 is such that with one revolution of the shaft 28', the feed rolls 214 and 215 are rotated sufficiently to advance the recording sheet 211 a distance equal to the separation of two adjacent scanning lines. At the beginning of each scanning operation the drum 230 is rotated from the position shown in the direction of the arrow, thereby drawing the carriage 234 to the right. Continued rotation of the shaft 28' causes the line 232 to be wound upon the drum 230 until the carriage 234 has been moved to its extreme right hand position. At this time the line 232 will have been wound upon the drum 230, that is, approximately one complete turn of the cord will have been made upon the drum. The continued rotation of the disc 228 in the direction of the arrow brings the line 232 into engagement with the sloping surface of the deflecting member 231. This surface is so designed that as the disc continues to rotate, the one wrapping of the line 232 about the drum 230 will be dislodged from the drum. The carriage 234 is then influenced solely by the retractile line 239 which pivots the carriage to lift the stylus 59' from the surface of the recording sheet and substantially instantaneously drawing the carriage to its extreme left hand starting position.

When it is desired to maintain synchronism between the transmitting and recording apparatus by means of the start-stop principle, a stop arm 248 is attached to the disc 228. A latch structure 249 is provided and positioned so that it may be moved into or out of the path of the stop arm 248 under control of the magnet 97' which is indicated in diagrammatic manner in the figure. The stop arm 248 is positioned on the disc 228 relative to the deflecting member 231 so that it is in position to be engaged by the latch 249 at substantially the same time that the deflecting member completes the dislodgement of the line 232 from the drum 230. Thus, further scanning is prevented until the scanning apparatus is released by energizing the electromagnet 97'. The recording circuit connected to the stationary contacts 101 and 102 is controlled by a tongue 100' of the armature structure 248, and the recording circuit is adapted to operate in the manner either of Fig. 7 or Fig. 8, depending upon the particular wiring arrangement employed.

In each of the continuous strip records obtained the recorded signals appear in rows on the paper strips generally as indicated in Fig. 13. Bias and other losses produce the same shifts and effects on this type of chart as on the radial type, and if desired, guide lines may be imprinted on the chart paper for reference.

As described herein, a record may be made of the signals as received by the selector magnet itself, which corresponds to an integral part of the receiving teleprinter, rather than causing the signals to be recorded by means of an auxiliary relay connected in circuit with line L, which latter arrangement would give a somewhat less accurate record of the actual performance of the teleprinter upon these signals. Other forms of synchronizing mechanism known in the art may, of course, be employed and the device may be constructed to provide signal records of other telegraph codes. For brevity in the specification and claims, the term "chart" is employed in a generic sense to define a sheet, web or other form of a recording medium on which marks representative of the received signals may be recorded in accordance with the principles of the instant invention.

It will be appreciated that the invention herein disclosed will suggest various other modifications and uses to those skilled in the art, without departing from the principles of the invention. The embodiments disclosed herein are intended, therefore, to be regarded as illustrative of the principles of the invention which is not to be limited except as indicated by the scope of the appended claims.

I claim:

1. A device for testing and recording the quality of received start-stop marking and spacing permutation code telegraph signals, comprising an electromagnet and an associated armature responsive to the incoming signals to be tested, a first contact element actuatable by means including said armature selectively to either of two circuit-controlling positions respectively corresponding to marking and spacing signal pulses, at least one other contact element engageable by the first contact element when actuated to one of said positions, means for supporting a signal recording chart, means including a marking stylus for marking the chart, driving means for causing relative movement between the chart and marking stylus in one direction at a predetermined fixed rate, means for causing relative movement between the chart and marking stylus in another direction at a predetermining rate, means including said electromagnet and structure controlled thereby for starting and stopping the relative movement between the chart and marking stylus in response to the start and stop pulses of the incoming signals, and means including a recording circuit controlled by said contact elements for causing the marking stylus to record a plurality of marks on the chart for each successive permutation code signal transmitted in a series of consecutive permutation code signals, said recorded marks defining in order the quality of the respective code elements of the received signals.

2. A device for testing and recording the quality of received start-stop marking and spacing permutation code telegraph signals, comprising an electromagnet and an associated armature responsive to the incoming signals to be tested, a first contact element actuatable by means including said armature selectively to either of two circuit-controlling positions respectively corresponding to marking and spacing signals, a pair of contact elements engageable selectively by the first contact element when actuated to one of said positions, means for supporting a signal recording chart, means including a marking stylus for marking the chart, driving means for causing relative movement between the chart and marking stylus at a predetermined fixed rate, means including said electromagnet and structure controlled thereby for starting and stopping the relative movement between the chart and marking stylus in response to the start and stop pulses of the incoming signals, and means including a recording circuit controlled by said contact elements for causing the marking stylus to record a plurality of marks on the chart for each successive permutation code signal transmitted in a series of consecutive permutation code signals, said recorded marks defining in order the quality of the respective code elements of the received signals, said recording circuit including circuit controlling structure for causing the marking stylus selectively to record marks representative either of said marking signals or spacing signals or both.

3. A device for testing and recording the quality of received start-stop marking and spacing permutation code telegraph signals, comprising an electromagnet and an associated armature responsive to the incoming signals to be tested, a first contact element actuatable by means including said armature selectively to either of two circuit controlling positions respectively corresponding to marking and spacing signals, at least one other contact element engageable by the first contact element when actuated to one of said positions, means for supporting an electrosensitive signal recording chart, means including an electrical stylus for marking the chart, driving means for causing relative movement between the electrosensitive chart and the stylus at a predetermined fixed rate, means including said electromagnet and structure controlled thereby for starting and stopping the relative movement between the chart and stylus in response to the start and stop pulses of the incoming signals, and means comprising a source of marking current and a recording circuit controlled by said contact elements for causing the stylus intermittently to apply marking current to said chart to record a plurality of marks thereon for each successive permutation code signal transmitted in a series of consecutive permutation code signals, said recorded marks defining in order the quality of the respective code elements of the received signals.

4. A device for testing and recording the quality of received start-stop marking and spacing permutation code telegraph signals, comprising an electromagnet and an associated armature responsive to the incoming signals to be tested, a first contact element actuatable by means including said armature selectively to either of two circuit-controlling positions respectively corresponding to marking and spacing signals, at least one other contact element engageable by the first contact element when actuated to one of said positions, means for supporting an electrosensitive signal recording chart, means including an electrical stylus for marking the chart, rotatable driving means for causing relative rotary movement between the electrosensitive chart and the stylus at a predetermined fixed rate, means including said electromagnet and structure controlled thereby for starting and stopping the relative rotary movement between the chart and stylus in response to the start and stop pulses of the incoming signals, and means comprising a source of marking current and a recording circuit controlled by said contact elements for causing the stylus to apply marking current to said chart to record a plurality of marks thereon for each successive permutation code signal transmitted in a series of consecutive permutation code signals, said recorded marks defining in order the quality of the respective code elements of the received signals.

5. A device for testing and recording the quality of received marking and spacing start-stop permutation code telegraph printer signals, comprising a magnet substantially identical to a start-stop printer selector magnet and an associated armature responsive to the incoming signals to be tested, a first contact element actuatable by means including said armature selectively to either of two circuit-controlling positions respectively corresponding to marking and spacing signal pulses, at least one other contact element engageable by the first contact element when actuated to one of said positions, means for supporting a signal recording chart, means including a marking element for marking the chart, driving means for causing relative movement between the chart and marking element at a predetermined fixed rate, means including said magnet and latch structure substantially identical to printer start-stop latch structure controlled thereby for starting and stopping the relative movement between the chart and marking element in response to the start and stop pulses of the incoming signals, and means including a recording circuit controlled by said contact elements for causing the marking element to record a plurality of marks on the chart for each successive permutation code signal transmitted in a series of consecutive permutation code signals, said recorded marks defining in order the quality of the received signals.

6. A device for testing and recording the quality of received marking and spacing start-stop permutation code telegraph printer signals, comprising a magnet substantially identical to a start-stop printer selector magnet and an associated armature responsive to the incoming signals to be tested, a first contact element selectively actuatable by means including said armature to either of two circuit-controlling positions respectively corresponding to received marking and spacing signal pulses, at least one other contact element engageable by the first contact element when actuated to one of said positions, means for supporting a signal recording chart, means including a marking element for marking the chart, means comprising a driving shaft, a driven shaft, and a slip clutch interconnecting said shafts for driving and causing relative movement between the chart and marking element at a predetermined rate, means including latch structure adapted to restrain said driven shaft from rotation, means commprising said magnet for controlling said latch structure to start and stop the relative movement between the chart and marking element in response to the start and stop pulses of the incoming signals, and means including a recording circuit controlled by said contact elements for causing the marking element to record marks on the chart representative of the quality of the received start-stop signals.

7. A device for testing and recording the quality of received marking and spacing start-stop telegraph printer signals, comprising a magnet substantially identical to a start-stop printer selector magnet and an associated armature responsive to the incoming signals to be tested, a first contact element actuatable by means including said armature selectively to either of two circuit-controlling positions respectively corresponding to marking and spacing signal pulses, a second contact element engageable by the first contact element when actuated to one of said positions, means for supporting a signal recording chart, means including a marking element for marking the chart, means comprising a driving shaft, a driven shaft, and a slip clutch interconnecting said shafts for driving and causing relative movement between the chart and the marking element at a predetermined rate, means comprising latch structure adapted to restrain said driven shaft from rotation, means comprising said magnet for controlling said latch structure to start and stop the relative movement between the chart and marking element in response to the start and stop pulses of the incoming signals, manually operable means for latching said armature in start position, and means including a recording circuit controlled by said contact elements for causing a marking element to record marks on the chart representative of the quality of the received signals.

GEORGE L. ERICKSON.

REFERENCES CITED

The following references are of record in the file of this patent:

UNITED STATES PATENTS

| Number | Name | Date |
|---|---|---|
| 2,075,897 | Hearn | Apr. 6, 1937 |
| 2,102,708 | Howle | Dec. 21, 1937 |
| 2,184,916 | Howle | Dec. 26, 1939 |

OTHER REFERENCES

Belle System Technical Journal, vol. 18, 1939 pages 143–189 inclusive.

Bramhall, Telegraph Transmission Testing Machine, Trans. A. I. E. E., vol. 50, June 1931, pages 404–412. (Copy in Patent Office Library.)